United States Patent Office 3,478,965
Patented Nov. 18, 1969

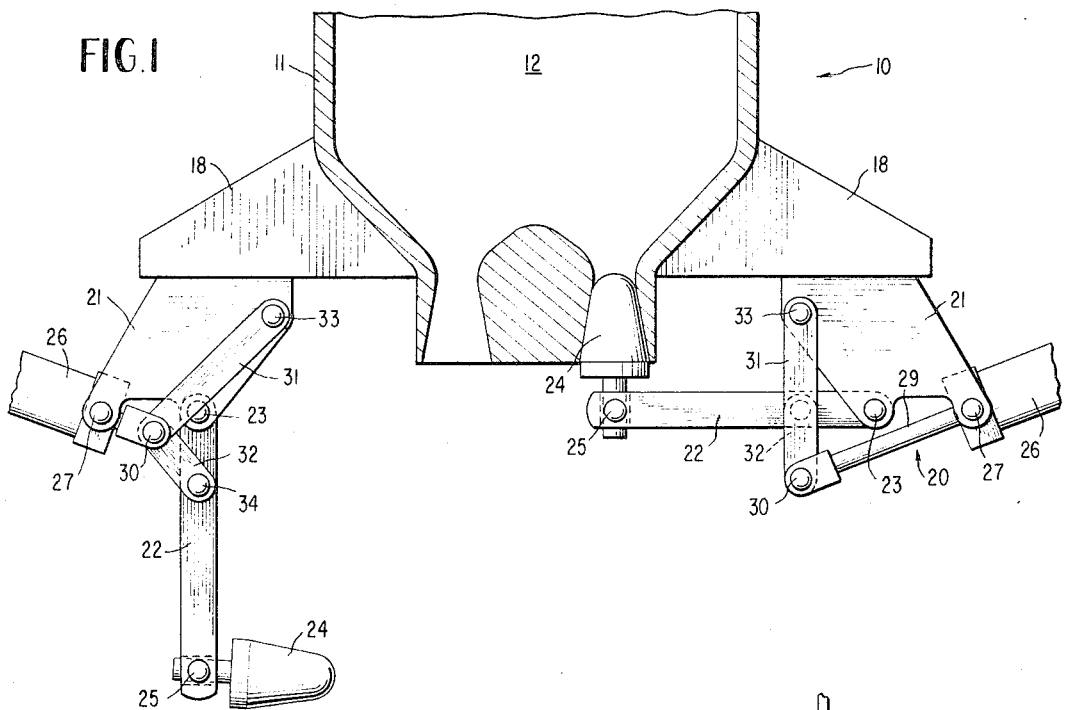
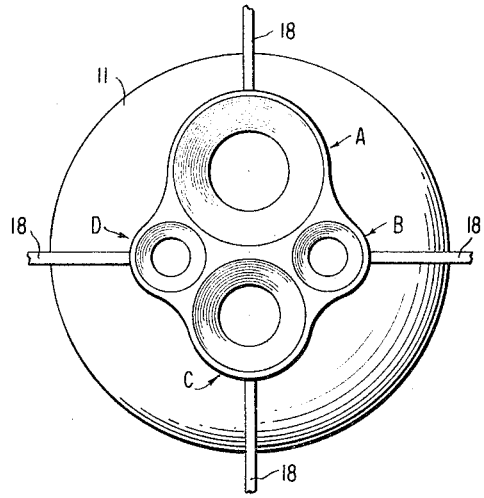
| % OF TOTAL THRUST | NOZZLES OPEN | NOZZLES CLOSED |
|---|---|---|
| 100 | A,B,C,D | |
| 90 | A,B,C | D |
| 80 | A,C | B,D |
| 70 | A,B,D | C |
| 60 | A,B | C,D |
| 50 | A | B,C,D |
| 40 | B,C | A,D |
| 30 | C | A,B,D |
| 20 | B,D | A,C |
| 10 | B | A,C,D |
INVENTOR
THOMAS E. LLEWELLYN
BY *Browne, Schuyler & Beveridge*
ATTORNEYS

3,478,965
VARIABLE THRUST ROCKET ENGINE
Thomas E. Llewellyn, 222 Beattie Ave.,
Lockport, N.Y. 14094
Filed Oct. 19, 1966, Ser. No. 587,739
Int. Cl. B64c *15/10;* F02k *1/24*
U.S. Cl. 239—265.25                              4 Claims

ABSTRACT OF THE DISCLOSURE

A variable thrust rocket engine having a plurality of thrust nozzles which may be closed to vary the thrust of the engine. The nozzles each have a fixed throat area, and are closed selectively to produce the desired thrust level.

---

This invention relates to rocket engines, and more particularly to an improved control rocket engine including means for varying the thrust of the engine in predetermined thrust level steps.

In conventional liquid propellant rocket engines, the thrust of the engine will vary directly with the nozzle throat area for any given combustion chamber pressure. Thus, to vary the thrust of an engine having a fixed nozzle throat area, it is necessary to vary the flow rate of the propellant to the combustion chamber to thereby vary the pressure within the combustion chamber. Variation of pressure within the combustion chamber, and consequently of the velocity of the gas through the nozzle results in a substantial loss of nozzle efficiency for a fixed nozzle area engine. While this loss of nozzle efficiency can be reduced somewhat by providing means for varying the throat area of the nozzle to thereby maintain the velocity through the nozzle nearer the optimum rate, these devices have not been entirely satisfactory in that they require a change in the geometry of the nozzle. Thus, the nozzle must be designed for operation over a wide range of throat area sizes, with the result that the most efficient nozzle configuration can seldom be employed. Accordingly, it is a primary object of the present invention to provide a control rocket engine having an improved means for varying the thrust level of the engine.

Another object of the invention is to provide a control rocket engine in which the thrust level of the engine may be varied in predetermined specific thrust level steps.

Another object is to provide such a rocket engine including a plurality of fixed-throat-area nozzles which may be selectively opened or closed to provide specific thrust level steps for the engine.

Another object of the invention is to provide such a rocket engine including a plurality of different sized nozzles each designed for maximum operating efficiency at or near the same combustion chamber pressure.

Other objects and advantages of the invention will become apparent from the following specification, taken with the drawing, in which:

FIGURE 1 is a fragmentary elevation view, in section, of a control rocket engine embodying the present invention;

FIGURE 2 is a bottom plan view of the engine shown in FIGURE 1 and illustrating one (1) arrangement of the thrust nozzles; and FIGURE 3 is a tabulation of thrust level steps, shown in percentage of total thrust, available from the arrangement of nozzles shown in FIGURE 2.

Referring now to the drawings in detail, a rocket engine illustrated generally by the reference numeral 10 is shown as including a motor housing 11 defining a combustion chamber 12. The combustion chamber 12 is provided at its lower, or exhaust end with a plurality of fixed thrust nozzles, A, B, C, and D. The nozzles have their longitudinal axis generally parallel to the longitudinal axis of the engine, and are closely grouped about the longitudinal axis of the engine.

Each of the nozzles A, B, C, and D are designed for maximum operating efficiency at a predetermined optimum operating pressure for the combustion chamber 12. Nozzle A has a throat area, i.e., the cross-sectional area at the smallest diameter section of the nozzle, which is equal to 50% of the combined throat area of all the nozzles. Nozzle B has a throat area equal to 30% of the total nozzle area, and nozzles C and D each have a throat area equal to 10% of the total nozzle area.

A rigid mounting bracket 18 is welded to the outer surface of housing 11 and projects radially outward therefrom adjacent each of the thrust nozzles. Mounted on each of the brackets 18 is a nozzle plug actuating assembly illustrated in FIGURE 1, with one of the assemblies being shown in the closed position and the other in the opened or retracted position. Since the nozzle plug actuating mechanisms are identical, only one will be described in detail, with like reference numerals identifying like parts in each of the assemblies.

The nozzle plug actuating assembly is illustrated generally by the reference numeral 20 and includes a rearwardly extending bracket 21 rigidly supported, as by welding, on mounting bracket 18. An elongated arm 22 has one end pivotally mounted, as by pin 23 on bracket 21, and supports rigid plug member 24 on its other end. Plug 24 is supported for limited pivotal movement about an axis perpendicular to the longitudinal axis of bar 22, as by pin 25, to permit the plug 24 to axially align itself with the nozzle with which it is associated as the plug is inserted into the open rear end of the nozzle. The plug 24 has its outer surface contoured to snugly fit within and form of a fluid tight seal with the outwardly divergent portion of the associated nozzle. If desired suitable seal means, not shown, may be provided to assure a fluid-tight seal between the plug and the nozzle.

A fluid motor 26 is pivotally mounted, as by pin 27 on flange 21 to move the plug 24 between the closed position in which the plug is inserted into a nozzle and the open or retracted position with the plug spaced rearwardly and laterally outward from the nozzle. The piston rod 29 of fluid motor 26 has its end pivotally connected, as by pin 30, to one end of a pair of links 31, 32. The link 31 has its other end pivotally connected, as by pin 33, to bracket 21 so that movement of the piston rod 29 within fluid motor 26 will cause link 31 to pivot about pin 33, which pivotal movement will rock the fluid motor about pivot pin 27. The arm 32 has its other end pivotally connected, as by pin 34, to the arm 22 at a point intermediate the pivot pins 23 and 25 so that movement of the piston rod 29, acting through link 32, will pivot the arm 22 about its pivotal support 23. The length of the members 31 and 32, and the location of the pivot point 23, is such that, as the piston rod 29 is projected to force the plug 24 into a nozzle, the members 31, 32 approach a dead-center position in which the ratio of angular movement of the arm 22 to movement of the piston rod 29 is very small, thereby giving the fluid motor great mechanical advantage in forcing the plug 24 into the nozzle. Suitable means, not shown, is provided for directing fluid under pressure to the respective fluid motors 26 to selectively close or open any desired combination of the thrust nozzles A, B, C, andD.

With the combination of nozzle throat area sizes chosen for illustration here, it is apparent that the total thrust of the engine may be varied in 10% increments from zero to 100% by opening or closing various combinations of the nozzles. This is accomplished while the pressure within the combustion chamber 12 is maintained constant at the predetermined optimum operating pressure by conventional means. Since the individual nozzles are designed for their most efficient operation at this optimum pressure, no loss of nozzle efficiency is encountered in varying the thrust from 10 to 100%, in 10% incremental steps.

It is believed apparent that smaller or larger increments, as described, could be provided with a different combination of nozzle sizes. Also, a slight variation in combustion chamber pressure could be employed to give slight variations from the incremental pressure without undue loss of efficiency since the nozzles would always be operating near their most efficient range.

While the present invention may be employed with rocket engines of any size, it is particularly well adapted for relatively small control-type rocket engines which may be repeatedly employed to provide thrust for relatively short periods, as, for example, the control or stabilization rockets in a spacecraft. When used in this type installation, it is believed apparent that the actuating mechanism for inserting and removing the plugs from the nozzles may be mounted separately from the rocket motor case, as on the frame structure of the spacecraft. Also, while the invention is illustrated as employing a plug member inserted from the exhaust end of the nozzle, it is believed that other arrangements could be provided for completely blocking and selectively opening the nozzles.

While I have disclosed a preferred embodiment of my invention, I wish it understood that I do not intend to be restricted solely thereto, but that I do intend to include all embodimens thereof which would be apparent to one skilled in the art and which come within the spirit and scope of my invention.

I claim:
1. A rocket engine comprising a combustion chamber having a plurality of thrust nozzles leading therefrom, said nozzles each having a fixed nozzle throat area, with at least one of said nozzles having a throat area substantially larger than the throat area of another of said nozzles, and closure means for selectively closing each of said nozzles to vary the thrust of said engine.

2. The rocket engine defined in claim 1 wherein said combustion chamber has at least one nozzle each of at least three materially different throat areas.

3. A rocket engine comprising a combustion chamber having a plurality of thrust nozzles leading therefrom, said thrust nozzles each having a fixed throat area, and closure means for selectively closing each of said nozzles to vary the thrust of said engine, said closure means including a plug member adapted to be inserted into and close the respective nozzles, and means for moving said plugs between a closed position inserted in the respective nozzles and a restracted position spaced rearwardly and laterally from the respective nozzles.

4. The rocket engine defined in claim 3 wherein each of said plugs is supported upon one end of an elongated arm and wherein the other end of the respective arms are pivotally supported at a point spaced laterally and rearwardly from the outlet of the associated nozzle, and fluid motor means selectively operable to move said arms about said pivotal mounting to move the respective plugs between the closed and the retracted positions.

References Cited

UNITED STATES PATENTS

| | | | |
|---|---|---|---|
| 2,481,059 | 9/1949 | Africano | 60—263 XR |
| 2,497,888 | 2/1950 | Hirschfelder | 60—263 XR |
| 2,694,289 | 11/1954 | Alford | 60—242 |
| 3,145,531 | 8/1964 | Deutsch | 60—229 XR |
| 3,245,217 | 4/1966 | Hook et al. | 60—229 |
| 3,245,620 | 4/1966 | McEwen | 60—229 XR |
| 3,344,603 | 10/1967 | Iwanciow | 60—204 |

FOREIGN PATENTS

| | | |
|---|---|---|
| 659,758 | 10/1951 | Great Britain. |
| 757,457 | 9/1956 | Great Britain. |

CARLTON R. CROYLE, Primary Examiner

U.S. Cl. X.R.
60—229, 263